(12) United States Patent
Riley

(10) Patent No.: US 6,259,398 B1
(45) Date of Patent: Jul. 10, 2001

(54) MULTI-VALUED VARIABLE AMBIGUITY RESOLUTION FOR SATELLITE NAVIGATION SIGNAL CARRIER WAVE PATH LENGTH DETERMINATION

(75) Inventor: Wyatt Riley, Fremont, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/574,897

(22) Filed: May 19, 2000

(51) Int. Cl.$^7$ .................................................. H04B 7/185
(52) U.S. Cl. ................................. 342/357.04; 342/357.11
(58) Field of Search ........................ 342/357.04, 357.06, 342/357.01, 357.11, 462; 701/213

(56) References Cited

U.S. PATENT DOCUMENTS

| | | | |
|---|---|---|---|
| 4,870,422 | * 9/1989 | Counselman | 342/357 |
| 5,359,332 | 10/1994 | Allison et al. | 342/357 |
| 5,534,875 | 7/1996 | Diefes et al. | 342/357 |
| 5,548,293 | 8/1996 | Cohen | 342/357 |
| 5,583,513 | 12/1996 | Cohen | 342/357 |
| 6,005,514 | * 12/1999 | Lightsey | 342/365 |

OTHER PUBLICATIONS

Jeff Hurn for Trimble Navigation, Differential GPS Explained—An expose of the surprisingly simple principles behind today's most advanced positioning technology, 1993 Sunnyvale, California.

Thomas A. Herring, "The Global Positioning System—Two dozen satellites hovering thousands of miles out in space are allowing people to locate themselves on the earth's surface with remarkable precision," *Scientific American*, Feb. 1996, pp. 44–50.

Peter H. Dana, "Global Positioning System Overview," http://www.utexas.edu/depts/grg/gcraft/notes/gps/gps.html#DODsystem, printed Oct. 14, 1999, pp. 1–12 and 2–page Table of Contents, Revised: Aug. 24, 1999 (first published in Sep., 1994) Department of Geography, University of Texas at Austin.

* cited by examiner

*Primary Examiner*—Dao Phan
(74) *Attorney, Agent, or Firm*—Testa, Hurwitz & Thibeault, LLP

(57) ABSTRACT

A method and system for performing integer ambiguity resolution for navigational positioning systems are described. A navigational positioning system includes a pair of receivers with antennas that simultaneously receive signals emitted from satellites or other moving or fixed sources. Potential solutions for the baseline vector between the antennas are determined. Test results are obtained for at least two tests performed on each potential solution. Examples of such tests include comparing a code double difference with each carrier phase double difference and comparing each potential solution with information known about the antennas. Each one of the potential solutions is evaluated as a candidate for a correct solution for the baseline vector. The evaluation of each potential solution is based on every test result obtained for that potential solution without disqualifying any one of the potential solutions as a candidate for the correct solution based on any one test result. A potential solution can therefore remain a candidate for the correct solution despite having produced what conventionally was considered a failing and disqualifying test result for a given test. A numerical or qualitative grade from a continuum of grades is assigned to each test result. The grades for a given potential solution are combined such that every assigned grade for that potential solution contributes to an overall grade that is used when searching for the correction solution from the plurality of potential solutions. Using the overall grades, various criteria can be used to select the correct solution from among the potential solutions.

26 Claims, 18 Drawing Sheets

ATTITUDE SYSTEM

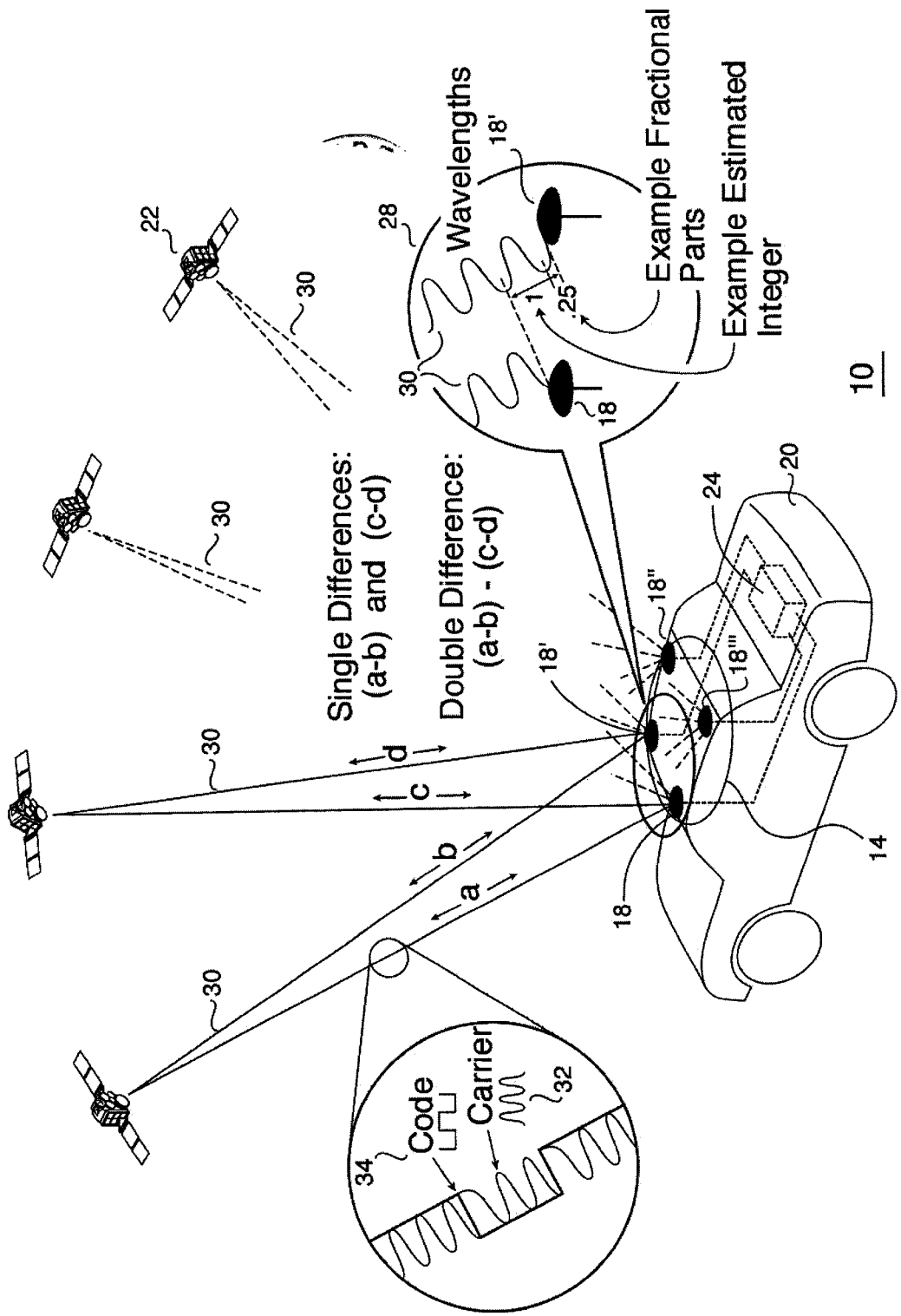
FIG. 1 ATTITUDE SYSTEM

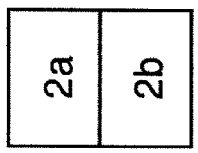

Fig. 2 =

| 2a |
|----|
| 2b |

Ambiguity Methods (120)

Search all possible integer ambiguities for each satellite-receiver double-difference and the corresponding baseline vector within a search range determined by the measured code double-difference, or a known, reasonable short baseline length, and other relevant information

— 122

→ (B) (to 2b)

Physical Methods (110)

— 112
Search all possible baseline vectors within a search range determined by code vector and/or other information — 114
Test fractional parts of carrier wavelengths to determine how good the spatial baseline vector matches the measured fractional carrier phases; for better "fits" assign a higher figure-of-merit — 116
Find local best figures-of-merit → (A) (to 2b)

FIG. 2a

Example: How well does the baseline length of one potential solution fit the known baseline length?
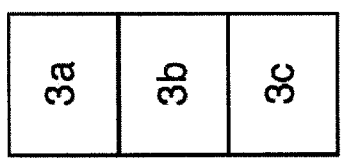
Fig. 3 =
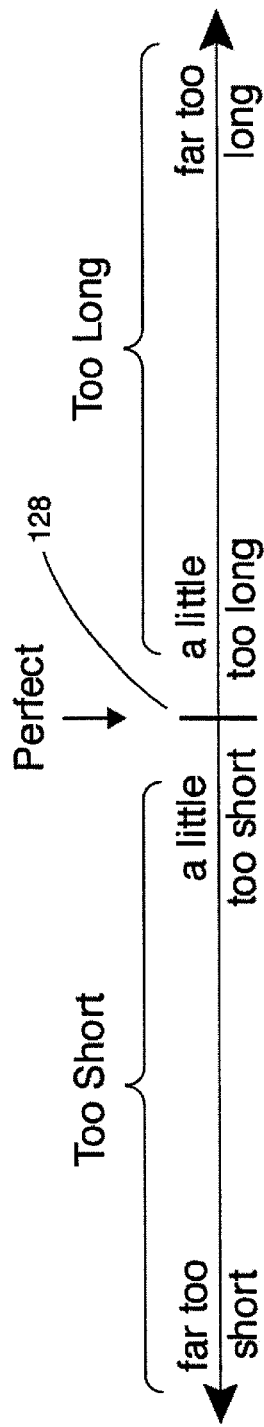
FIG. 3a

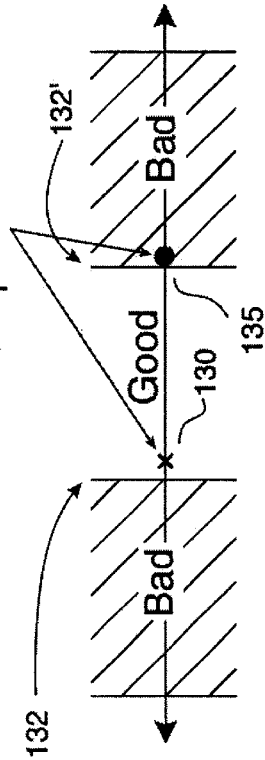
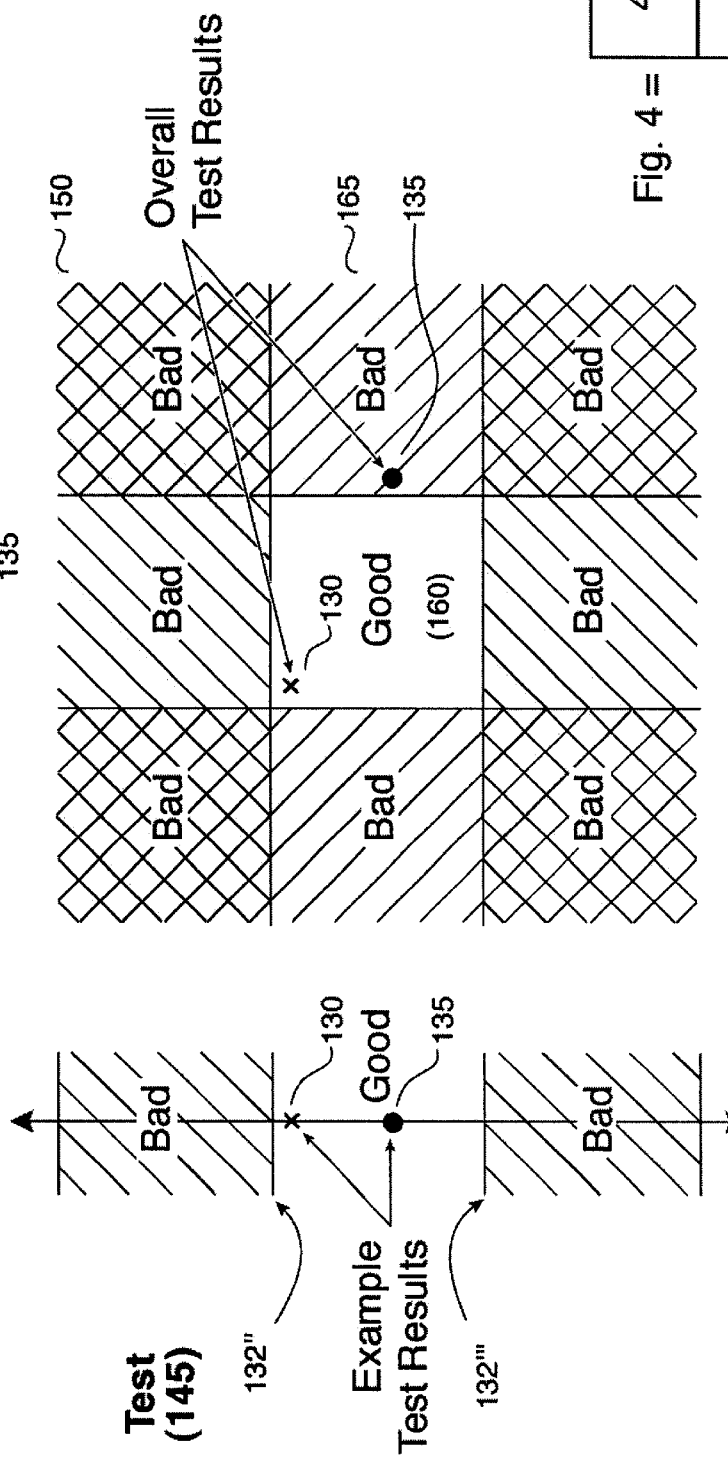
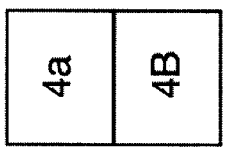
FIG. 4a Prior Art

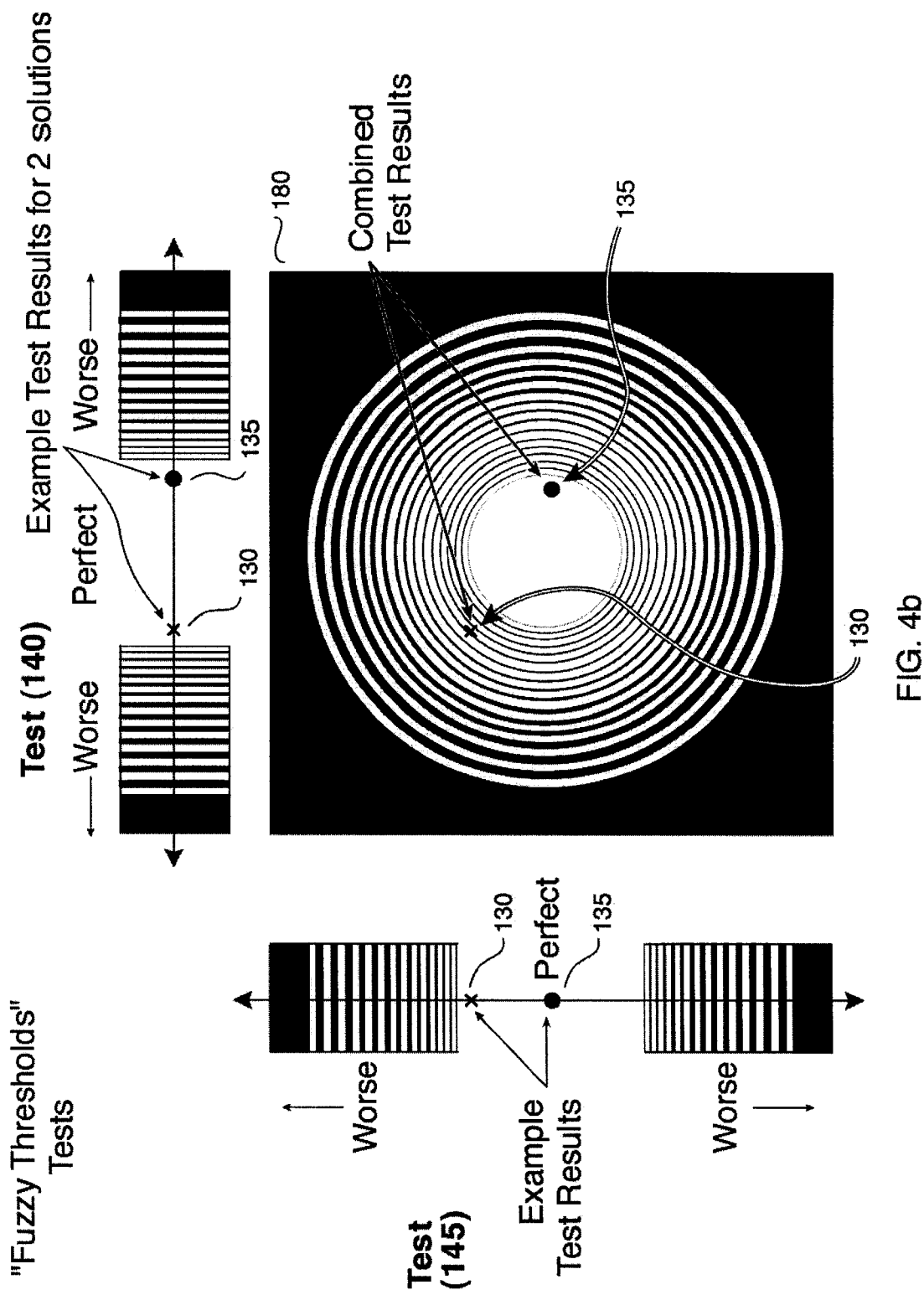

(from 5b)

252 — Multiply all of the relative likelihoods together:

$$\prod_i^n e^{\left(\frac{-(x_i^2)+1}{2}\right)}$$

254 — And finally despread them by the square root of the number of tests ($\sqrt{n}$):

$$\sqrt{n}\sqrt{\prod_i^n e^{\left(\frac{-(x_i^2)+1}{2}\right)}}$$

256 — Let this be the figure-of-merit for one solution

Example of 4-Antenna & 5-Antenna Architecture

Examples of Baseline Comparison with 4 Antennas

2 Baseline Comparisons

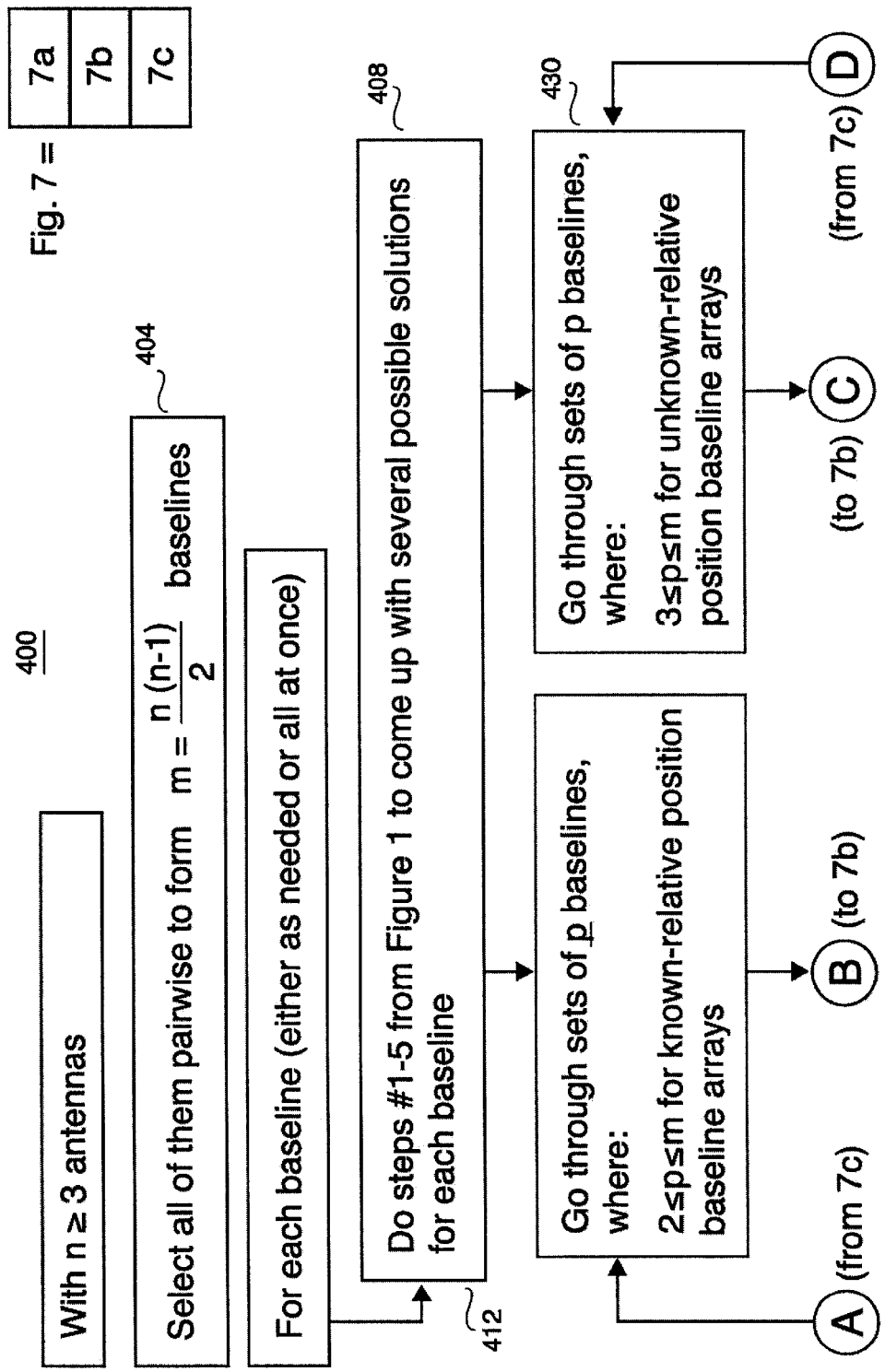
FIG. 7a  MULTIPLE BASELINES FLOWCHART

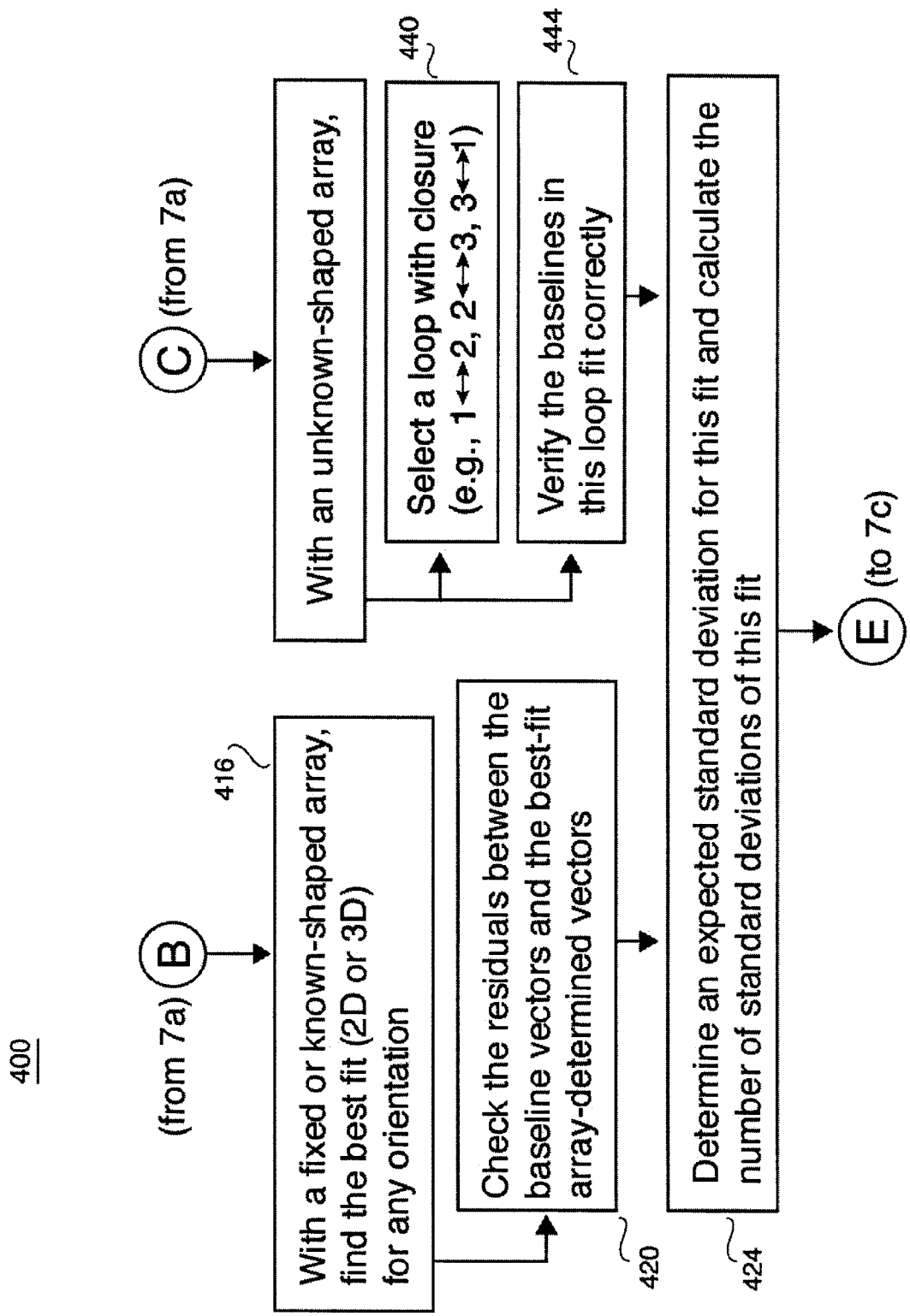
FIG. 7b    MULTIPLE BASELINES FLOWCHART

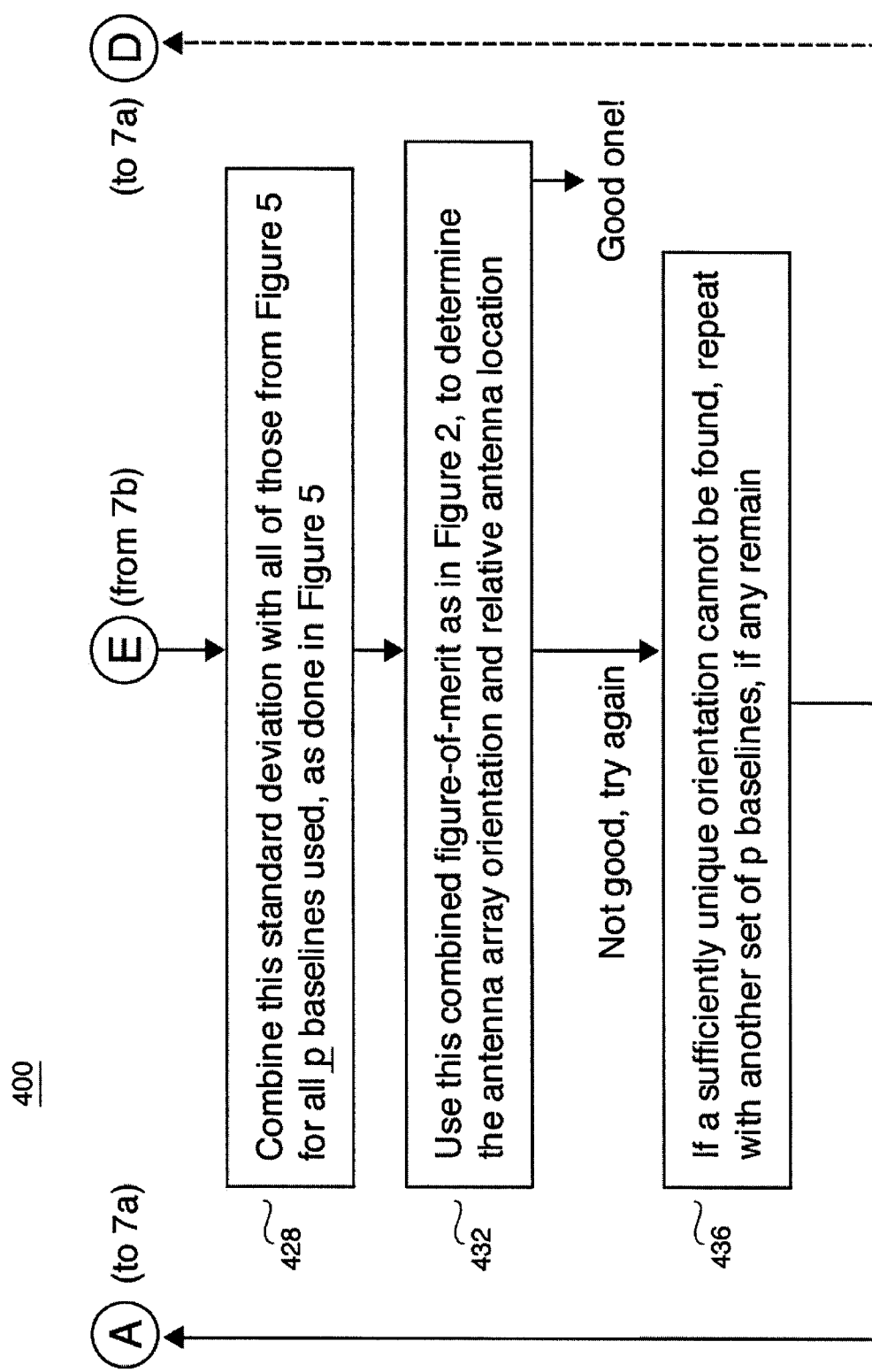
FIG. 7c  MULTIPLE BASELINES FLOWCHART

MULTI-VALUED VARIABLE AMBIGUITY RESOLUTION FOR SATELLITE NAVIGATION SIGNAL CARRIER WAVE PATH LENGTH DETERMINATION

FIELD OF THE INVENTION

This invention relates generally to precision attitude, position, velocity, and time measurement systems using satellite navigation system measurements. More specifically, the invention relates to systems and methods for inferring the differential path length of carrier wave signals between the satellite transmitter antenna and two or more receiver antennas for a set of satellite signals to enable accurate inference of the relative geospatial coordinates of the receiver antennas.

BACKGROUND OF THE INVENTION

The determination of the relative coordinates of points of a distributed physical system in a geospatial reference frame has application to a number of important problems. Attitude determination is a primary example. Early techniques for determining the attitude of a rigid body were based on the use of Earth-generated field phenomena. For example, one technique used sensors to detect the magnetic field direction of the Earth to determine magnetic compass heading of the rigid body and to sense the gravitational field direction of the Earth to determine the attitude of the rigid body with respect to the local gravitational vertical. These techniques have limited precision and accuracy because of complex local variations in the magnetic and gravitational fields of the Earth, difficulties in measuring such phenomena with high resolution, and unwanted coupling effects, such as acceleration effects on the sensors.

To determine the attitude of a rigid body in geospatial coordinates with high precision and accuracy, some techniques focus on measuring phenomena whose sources are more controllable than Earth-generated magnetic and gravitational fields. Optical techniques developed in surveying have achieved the desired levels of precision and accuracy, but are difficult to employ in many operating conditions, particularly with moving bodies. Recent techniques based on determining the transmission path lengths of code-modulated radio frequency signals transmitted from navigation satellite systems, such as the United States Global Positioning System (GPS) and the functionally-similar Global Navigation Satellite System (GLONASS) operated by Russia, have transformed surveying.

The geospatial location of each transmitting GPS satellite, or other signal source, as a function of time can usually be inferred from data contained in the transmitted signal. At the typical distances from the satellite, or other navigation signal source, to the surface of the Earth, the signal transmission paths can be considered nearly parallel for a physical body whose attitude is to be measured. The difference in the path lengths of the transmissions received at two satellite receiver antennas, separated by a baseline of known length, can be used to determine the attitude of the body in the plane defined by the satellite and the two separated receiver antennas. By using three or more satellite receiver antennas, arranged on the body so that they are not co-linear, the three-dimensional attitude in geospatial coordinates can be determined.

The measurement of the transmission path length from the satellite to a receiver antenna depends on the measured characteristics of the signal. The coded information imposed on the satellite carrier wave allows an unambiguous determination of the length of the transmission path. However, path length based on the coded information can only be measured to a relatively coarse resolution. Finer resolution requires the measurement of the carrier wave itself. For example, where the chip width of the coded information for GPS is approximately 300 meters, the wavelength of the GPS carrier signal is approximately 19 centimeters. This allows resolution of the transmission path length to fractions of a centimeter by phase measurement techniques within the GPS receiver.

Note that all carrier waves are identical and indistinguishable from each other. As a result, when the phase of the wave is determined at the receiver antenna, it is ambiguous which specific cycle of the carrier wave is being measured. The total path length from the satellite antenna to the receiver antenna is the sum of the GPS receiver's measured fraction of a cycle and an unknown number of integer cycles. Determining the specific wave cycle of the carrier wave that is being measured in phase is called cycle ambiguity resolution (also referred to as integer ambiguity resolution).

Typically, the information coded in the transmitted signal is used to bound the range in which the possible integer carrier cycles can exist. The code measurement for an individual signal establishes the maximum and minimum transmission path lengths possible for that signal. This bounding process is performed for all the satellite signals employed in the solution. The projection of these bounds into the solution space according to the direction vectors between the receiver antenna and the transmitter antenna establishes the geometric structure of the solution space. The correct solution for the numbers of integer cycles between the transmitter and the receiver antennas is the set of answers that satisfies all the constraints within the solution space. In practice, this process is usually done with single differences of measurements between antennas when the inter-receiver clock delays are well known, and with double difference measurements between receiving antennas and between signal transmitters when the inter-antenna time delay is not well known.

Techniques have arisen to perform the steps of determining the correct number of integer carrier cycles and measuring the fractional phase within a cycle. The performance of these techniques is evaluated based on the reliability of correctly resolving the integer values and the accuracy of the resulting solution. The existing methods are suboptimum in each of these regards.

The use of carrier cycle ambiguity resolution is not limited to the determination of body attitude. Similar techniques can be used to determine the vector offsets between two or more GPS antennas that are not rigidly fixed to the same body. In one case, the first or "reference" receiver may be fixed at a known surveyed location, while the second GPS receiver may be on a moving body. The purpose is to correct errors in the moving GPS receiver using data calibrated in accuracy by the reference receiver. The use of carrier cycle ambiguity resolution for this mode of "differential" GPS is often referred to as kinematic or real-time kinematic (RTK) GPS.

In another case, the first receiver may be at one unknown or moving location, and the second GPS receiver may be at a second unknown or moving location. In this case, the relative vector between the two GPS receivers is of interest. In yet another case, the use of carrier cycle ambiguity resolution can be focused on correcting the time measurement between a GPS reference receiver and a second remote GPS receiver.

SUMMARY OF THE INVENTION

An object of the invention is to provide an improved technique for carrier cycle ambiguity resolution. In one aspect, the invention features a method for use in a positioning system having a pair of satellite navigation system receivers with an antenna. The antennas simultaneously receive signals emitted from a plurality of signal transmitters. The method determines a baseline vector between the antennas of the receivers. A plurality of potential solutions for the baseline vector are determined. Test results are obtained for at least two tests performed on each potential solution. Each one of the plurality of potential solutions is evaluated as a candidate for a correct solution for the baseline vector. The evaluation of each potential solution is based on every test result obtained for that potential solution without disqualifying any one of the potential solutions as a candidate for the correct solution based on any one test result.

In one embodiment, a continuum of grades is defined for a given test. The grade continuum corresponds to degrees of closeness of actual test results for that test to a particular test result. Grades are assigned to the results of each test of the potential solution. Grades can be numerical values or qualitative measurements. The assigned grade corresponds to a closeness of the test result to a particular test result. In one embodiment, the particular test result is a match with known parameters of the positioning system.

In one embodiment, the grades assigned to the test results for a given potential solution are combined such that every assigned grade for the given potential solution contributes to an overall grade for that potential solution. This overall grade is then used when searching for the correction solution from the plurality of potential solutions.

A variety of tests can be applied to each potential solution to determine the closesness of that potential solution to being the correct solution. In one embodiment, at least one carrier phase double difference and a code double difference from the received signals are computed. The computed code double difference is compared with each computed carrier phase double difference. A grade is assigned to the test corresponding to a closeness of the code double difference to each carrier phase double difference. In another embodiment, an expected standard deviation is estimated for the closeness between the code double difference and each carrier phase double difference, and the expected standard deviation is compared with an actual deviation for each potential solution to determine the assigned grade.

In still another embodiment, the test includes comparing each potential solution with known information relating to the receivers. For example, the known information can be a length of the baseline vector between antennas of the two receivers, an elevation angle between antennas of the two receivers, and/or an azimuth angle between antennas of the two receivers. The known information can be precisely known or include a degree of uncertainty. For example, the known information can be a range of potential angles between antennas of the two receivers.

Various criteria can be used to select the correct solution from among the potential solutions. In one embodiment, a particular potential solution is determined to be the correct solution if the overall grade of that particular potential solution is the only one of the potential solutions above a predetermined threshold value. In another embodiment, a highest overall grade and a next highest overall grade are determined for the potential solutions; and the potential solution with the highest overall grade is selected as the correct solution if that highest overall grade is greater than the next highest overall grade by a predetermined margin.

Various methods can produce the potential solutions for the baseline vector. One embodiment computes a code double difference measurement and performs the ambiguity resolution within a search range determined from that code double difference measurement. Another embodiment performs the ambiguity resolution within a search range determined from a known length of the baseline vector between the receivers.

Performing ambiguity resolution produces a plurality of possible integers representing a number of whole carrier wavelengths. A carrier phase double difference measurement is computed for each receiver for each possible integer within the search range. In one embodiment, an implied baseline vector is computed based on the carrier phase double difference measurements. The carrier phase double difference from which the baseline vector is computed is compared with the actual carrier phase double difference measurement. In another embodiment, a plurality of possible baseline vectors are estimated and a fractional carrier wavelength calculated for each potential solution. A degree of matching between the calculated fractional carrier wavelength for the baseline vector is compared the measured fractional carrier wavelength for each potential solution. A grade is assigned to each potential solution based on the degree of matching for that potential solution. The potential solutions with a highest degree of matching is selected, and a plurality of integers representing a number of whole carrier wavelengths is determined for each potential solution having a degree of matching that exceeds a predetermined threshold.

In another aspect, the invention features a positioning system having a pair of receivers. Antennas of the receivers simultaneously receive signals emitted from a plurality of signal transmitters. The system determines a baseline vector between the receivers. A processor determines a plurality of potential solutions for the baseline vector. A tester performs at least two tests on each potential solution. An evaluator evaluates each one of the plurality of potential solutions as a candidate for a correct solution for the baseline vector. The evaluator bases the evaluation of each potential solution on every test result obtained for that potential solution without disqualifying any one of the potential solutions as a candidate for the correct solution based on any one test result.

DESCRIPTION OF THE FIGURES

The above and further objects, features, and advantages of the invention will become clear from the following detailed description when read with reference to the accompanying drawings in which:

FIG. 1 is a diagram illustrating an exemplary embodiment of an attitude determination system, including an array of antennas on a vehicle, embodying the principles of the invention;

FIG. 3A is a diagram illustrating an example of a multiple-valued scale or continuum of test results for a test statistic obtained from a potential solution;

FIG. 4A is a diagram illustrating a conventional process that uses binary logic or "hard" cutoffs to combine test statistics to eliminate potential baseline vector solutions from being selected as a correct solution;

FIG. 4B is a diagram illustrating an embodiment of a process that uses multi-valued variable thresholds to combine test statistics for a potential solution into an overall performance for that potential solution;

FIG. 7 is a diagram illustrating embodiments of a process used to determine the array attitude using multiple baselines.

DETAILED DESCRIPTION OF THE INVENTION

Figure 2B:
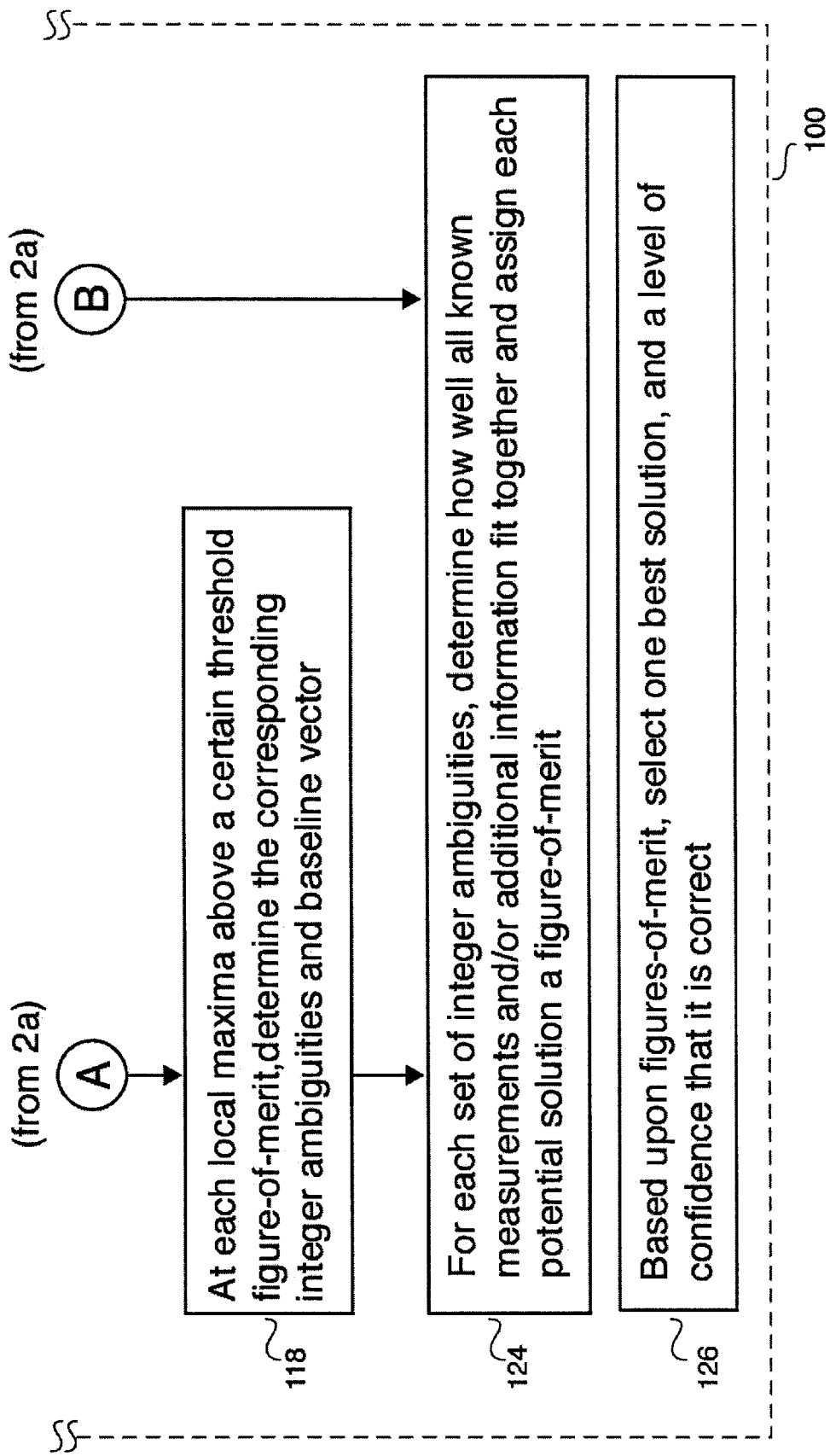
FIG. 2 is a diagram illustrating embodiments of a process that performs ambiguity resolution in accordance with the principles of the invention to measure the relative positions and attitude of antennas of the positioning system.

FIG. 1 shows a positioning or attitude determination system 10 embodying the principles of the invention. The positioning system 10 includes an array 14 of antennas 18, 18', 18", 18''' (generally 18) mounted on a rigid body 20, here a ground vehicle, and receiving signals 30 from a plurality of satellite transmitters 22. The satellites 22 broadcast the signals 30 from orbital positions that are known as a function of time. Each pair of antennas 18 defines a baseline, which is the line between two antennas 18. An important feature of each baseline is a vector, having both a scalar length between the antennas and an orientation of the line between the antennas in a three-dimensional geospatial coordinate system.

In this description, GPS is the satellite navigation system used to describe the principles of the invention, although such principles should work equally well with other satellite navigation system signals from sources other than GPS. The techniques described below should also work efficiently with any other navigation system signals with at least one coarse resolution component and at least one fine resolution component, including radio frequency navigation signals from non-orbiting sources, such as ground-based or airborne GPS pseudolites. The techniques described below should additionally function for other navigation system signals having two or more distinct path length resolution components that use other than radio frequency transmission mechanisms, including acoustic and optical signals. Such techniques may be used for, but not limited to, the geospatial attitude determination of the antenna array 14.

In one embodiment, the broadcast signals 30 are GPS signals that contain a sinusoidal carrier signal 32 transmitted at a frequency of 1.575 GHz (the GPS L1 signal) and modulated by a coarse acquisition (C/A) pseudo-random noise (PRN) code component 34. The code component 34 has a superimposed 50 bit per second digital data stream containing information about the satellite ephemeris, clock bias terms, and other data. The combination of the information in the PRN code component 34 and the digital data component allows the receiver 24 to compute the position of the satellite 22 and its onboard clock time when the satellite 22 transmitted a particular segment of the PRN code. The insert 28 of FIG. 1 shows an example of wave paths taken by the GPS signals 30 to the antennas 18 and 18'. In this example, the path to the antenna 18' is longer than the wave path to the antenna 18 by an integer number of carrier cycles or wavelengths (here 1 cycle), plus a fractional number of wavelengths (here, 0.25 cycles).

A GPS receiver system 24 is in communication with the antennas 18 to receive and process signals 30 received by each of the antennas 18 from at least three satellites 22 that are in view. From the timing and satellite orbital position information in the PRN code and digital data components, the GPS receiver system 24 performs code range and carrier phase range measurements to determine the baseline vectors of the antenna array 18 in accordance with the principles of the invention. To perform such measurements, the GPS receiver system 24 can compute single or double differences of code and carrier phase range measurements between antennas. Single difference measurements, (e.g., in FIG. 1, (a–b) and (c–d)), involve GPS signals 30 received by two antennas 18 from one satellite 22. Double difference measurements (e.g., in FIG. 1, (a–b)–(c–d)) involve GPS signals 30 received by two antennas 18 from two satellites 22. Double difference measurements are used to eliminate the effects of receiver clock, satellite clock, and ephemeris inaccuracies. Techniques for computing single and double difference code and carrier phase measurements are known in the art.

Determination of the baseline vectors (i.e., length and orientation) of the antenna array 14 involves integer ambiguity resolution. Integer ambiguity resolution is the process of determining the number of integer wavelengths of the carrier component of a GPS signal 30 that lie between a given antenna and a given broadcasting GPS satellite 22 during a particular epoch.

Embodiments of the invention use multi-valued variable thresholds in place of binary pass-fail values for the definition of thresholds used to determine the likelihood that a certain ambiguity resolution and the resulting baseline vector solution is correct. In this description, the term "multi-valued" is used to describe the use of more than the two typical pass/fail states to describe the outcome of a test; this includes the possibility of using a continuous scale of numerical values. The use of multi-valued variables in this application is equivalent to the use of multiple variables in so-called "fuzzy logic" control systems.

Single Baseline Measurement

FIG. 2 shows embodiments of a process 100 that determines the vector for a single baseline between two of the antennas 18 in the antenna array 14 and resolves the corresponding integer carrier cycle ambiguities according to the principles of the invention. In brief overview, the process 100 computes a plurality of potentially correct solutions (hereafter, potential solutions) for the baseline vector and integer ambiguities from signals 130 received from the satellite transmitters 22. Then one or more tests are performed on each potential solution, and one of the potential solutions is selected as the correct solution based on the overall performance of that potential solution to every performed test.

In more detail, FIG. 2 shows two types of methods for producing potential solutions for the baseline vector and integer ambiguities. The first type is referred to as the "Physical Methods" 110; the second type as the "Ambiguity Methods" 120. Physical Methods 110 search for potential solutions in physical space, that is, the Physical Methods 110 search through potential 3-dimensional vectors, checking integer ambiguities, as described below in connection with steps 112, 114, 116, and 118. Ambiguity Methods 120 search for potential solutions in ambiguity space, that is, the Ambiguity Methods 120 search through possible integers for each satellite 22, checking redundant measurements and physical parameters, as described below in connection with step 122. After generating the potential solutions, by either a Physical Method 110 or an Ambiguity Method 120, the process 100 determines which of such potential solutions is the correct solution, as described below in connection with steps 124 and 126.

In one embodiment, the Physical Method 110 searches (step 112) all possible baseline vectors within a search range around the vector determined by the code measurement and any other available information (e.g., an elevation angle limit). The implied fractional parts of the carrier wavelengths are tested (step 114) to determine how well the candidate baseline vector solution matches the measured fractional carrier phases. For better matches, assign a higher figure of merit (e.g., here, a figure of merit is a value that corresponds to the closeness of the match). In step 116, local figures of merit are found with the highest values. In step 118, at each local maximum above a certain threshold figure of merit, the corresponding integer ambiguity values are determined. These sets of integer ambiguity values and their corresponding candidate baseline vectors make up the initial set of potential solutions.

In another embodiment, the Ambiguity Method 120 searches (step 122) all possible integer ambiguities for each satellite receiver carrier phase single or double difference within a search range determined by the measured code single or double difference. The search range can also be determined by, for example, the known (short) length of the baseline vector between the two antennas, or by the use of other information, such as elevation or azimuth angle limits. All of these sets of integer ambiguities and their corresponding baseline vectors make up the initial set of potential solutions.

For each set of potential solutions, produced by either the Physical Method 110 or the Ambiguity Method 120, the process 100 determines (step 124) how well all known measurements and additional information fit together. Examples of such known measurements and additional information include a known scalar length of the baseline between the two antennas, a known baseline elevation angle relative to the local horizontal, a known baseline azimuth angle relative to North in the local tangent plane, and/or a known range or probability density estimate of such lengths or angles. Such tests assist in determining which potential solution is most likely to be correct.

As described in detail below in FIGS. 3C, 4B, and 5, these tests use multi-valued variable thresholds, and each test applied to a potential solution is assigned a figure of merit. Here, a figure of merit is a value that corresponds to the closeness of the fit (i.e., consistency) of the potential solution with the known measurements and additional information. Each potential solution can undergo a variety of tests, with each test obtaining a figure of merit corresponding to the performance of that potential solution to that test. The figures of merit for a given potential solution are then combined to produce an overall figure of merit for that potential solution. Based on the overall figures of merit of the potential solutions, one potential solution is selected (step 126) as the best potential solution. A level of confidence that the selected solution is correct is then computed, based on the overall figure of merit of the best potential solution.

Figure 3B:
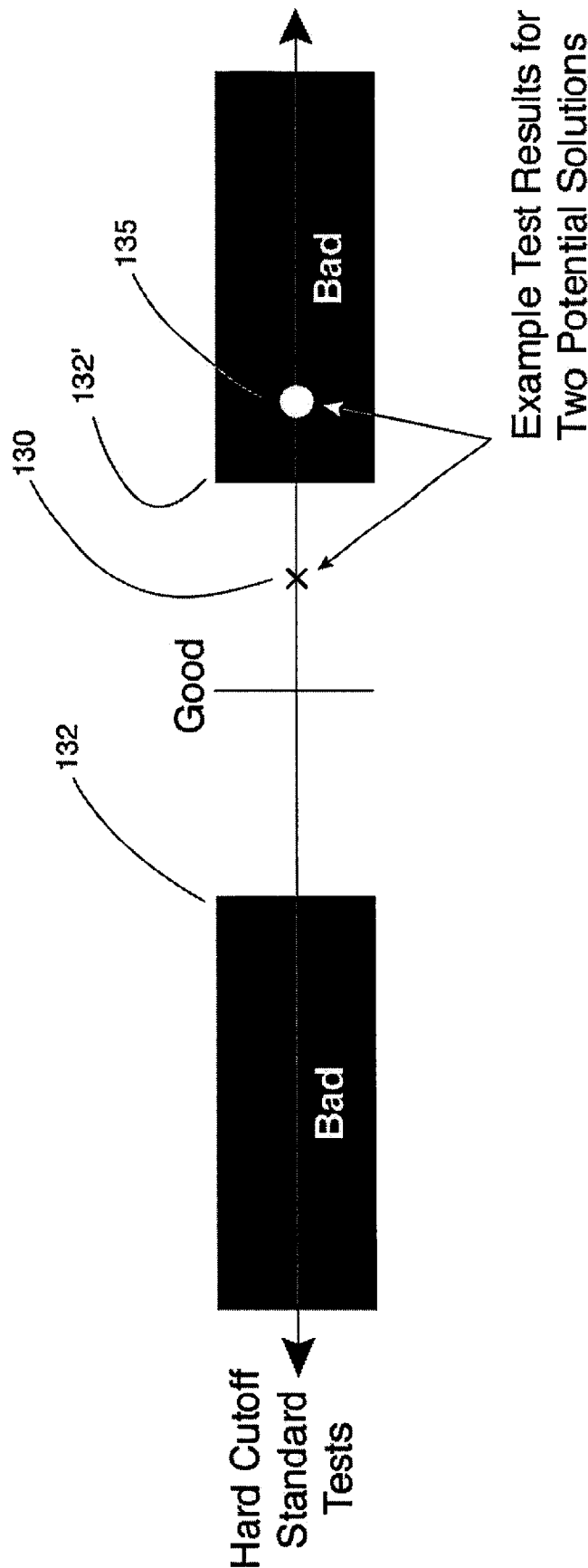
FIG. 3B is a diagram illustrating a standard test that uses hard cutoff thresholds to eliminate "bad" solutions, (i.e., solutions that are cut-off by the thresholds), from the set of potential solutions.
Figure 3C:
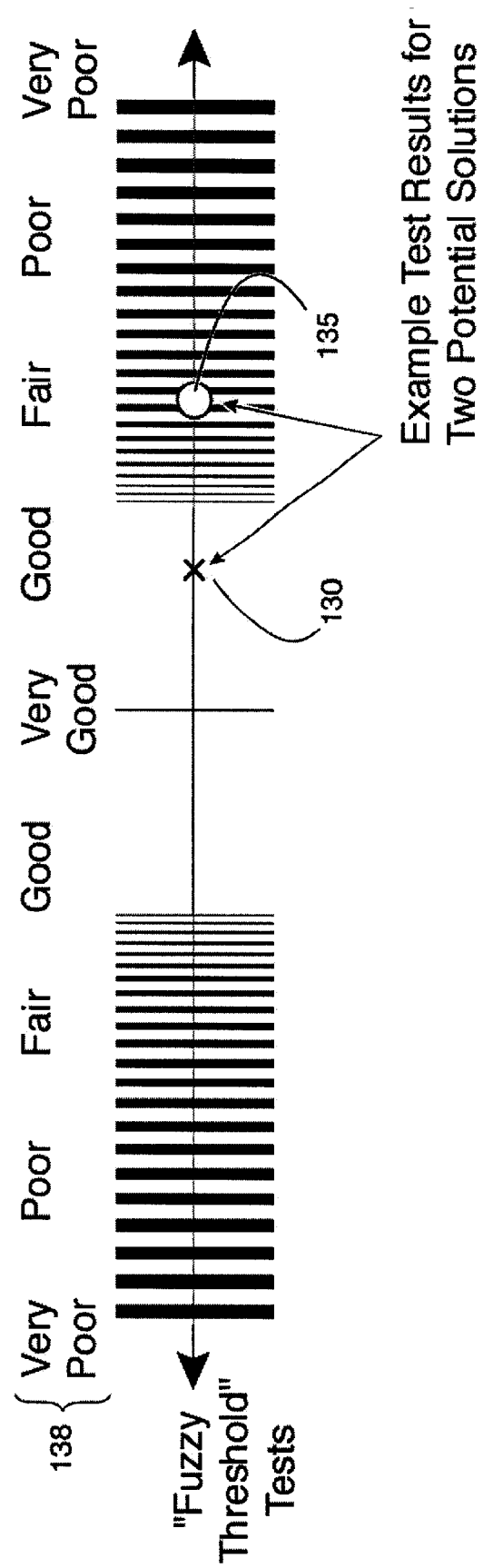
FIG. 3C is a diagram illustrating that the quality of a potential solution can be classified with more values than the binary choices of "good" or "bad", up to a continuum of values.

FIGS. 3A–3C illustrate an example of a multi-valued variable threshold test of one test statistic of a potential solution. When trying to decide how good a potential solution is, one relevant test is how well the baseline length of the potential solution fits with a known length of the baseline. For example, consider two antennas 18, 18' that are mounted to the vehicle 20 of FIG. 1 and for which the baseline length has been accurately pre-measured. As illustrated in FIG. 3A, the baseline length of the potential solution may perfectly match the known (pre-measured) baseline length 128, or the baseline length of the potential solution may be a little too long, a little too short, much too long or much too short, or any level in between or beyond. FIG. 3B shows a standard test that uses hard cutoff thresholds 132, 132' to determine that some potential solutions, e.g., the "x" 130, are good candidates for a correct solution and that some potential solutions further away from an exact match, e.g., the circle 135, are bad solutions that are eliminated from consideration as the correct solution.

Unlike the standard test, the FIG. 3C illustrates that the quality of the potential solution can be classified with more than just two values (i.e., good and bad). Rather, one can use several values 138 (e.g., very good, good, fair, poor, very poor . . . ) or even a continuum of values, represented by the shading, to determine how well this potential solution passes this test. For example, the potential solution represented by the "x" 130 is a better candidate for the correct solution than the potential solution represented by the circle 135, based on this one test statistic.

An advantage of using tests with multi-valued variable thresholds becomes apparent when the results from various tests are combined, as illustrated by FIGS. 4A and 4B. FIG. 4A shows two tests 140, 145, similar to the standard test in FIG. 3B, with one test 140 across the top of FIG. 4A and one test (145) down the left side. These two tests 140, 145 are for two different test statistics for two different potential solutions 130, 135. For example, test 140 can be "do the baseline length values match?" and test 145 can be "are the carrier phase residuals small?" A grid 150 represents the two-dimensional set of possible results of the two tests 140, 145. Note that if the result of either test for a potential solution is "bad," the overall result for that potential solution is bad. The effect of a binary or "hard" cutoff threshold is to eliminate any potential solution that fails one test, irrespective of the performance of that potential solution to other tests. For example, the "x" solution 130 barely passes both tests 140, 145, (i.e., is on the "good" side of the hard cutoffs 132, 132', 132", 132'"), but appears in a "good" region 160. In contrast, the circle solution 135 achieves a perfect result for test 145 and barely fails test 140, yet appears in a "bad" region 165.

FIG. 4B shows a combination of the same tests 140, 145 and corresponding test results of FIG. 4A using multi-valued variable thresholds, in accordance with the principles of the invention, to enable the results of all tests to factor into the evaluation of each potential solution 130, 135. More specifically, using multi-valued variable thresholds achieves a different overall result than the standard hard cutoff technique of FIG. 4A, namely, the circle solution 135 is valued more highly as the correct solution than the "x" solution 130.

In FIG. 4B, a multi-valued variable region 180 represents a two-dimensional set of possible combined test results for tests 140 and 145. The lighter shaded areas represent combined test results that are better than test results that appear in the darker shaded areas. In this case, the circle solution 135 is rated slightly more highly overall (in a lighter region) than the "x" solution 130, because the circle solution 135 performed perfectly on test 145, which made up for a somewhat worse performance on test 140.

Using a school analogy to look at combining more than two tests, consider two students who take ten tests. Student X receives a passing grade of D on all 10 tests. Student O receives a failing grade of F on one test and passing grades of A on all nine other tests. Using a hard-cutoff approach, similar to that in FIG. 4A, a student who failed any test (student O in this example) would be given a rating of "bad", while a student who passed all of the tests, even if just barely, would be given a rating of "good". Thus, the hard cutoff technique would consider Student X to be the better student, although arguably the better student is actually Student O. Using multi-valued variable thresholds, similar to that shown in FIG. 4B, the fact that Student O received nine A's along with the one F is taken into account, giving Student O a higher combined rating than student X who received all D's.

Figure 5A:
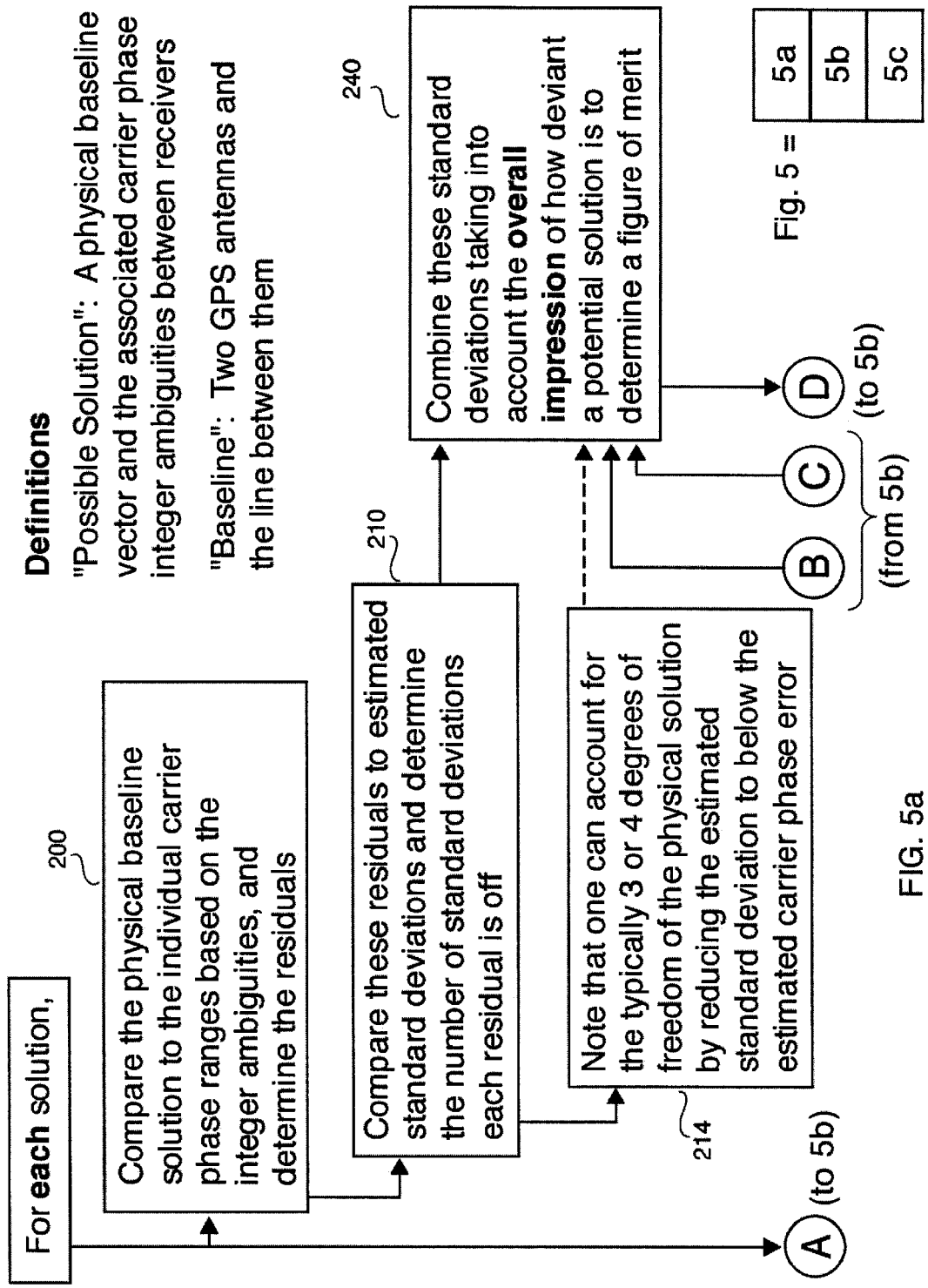
FIG. 5 is a diagram illustrating an embodiment of a process that uses multi-valued variable thresholds to perform ambiguity resolution.
Figure 5B:
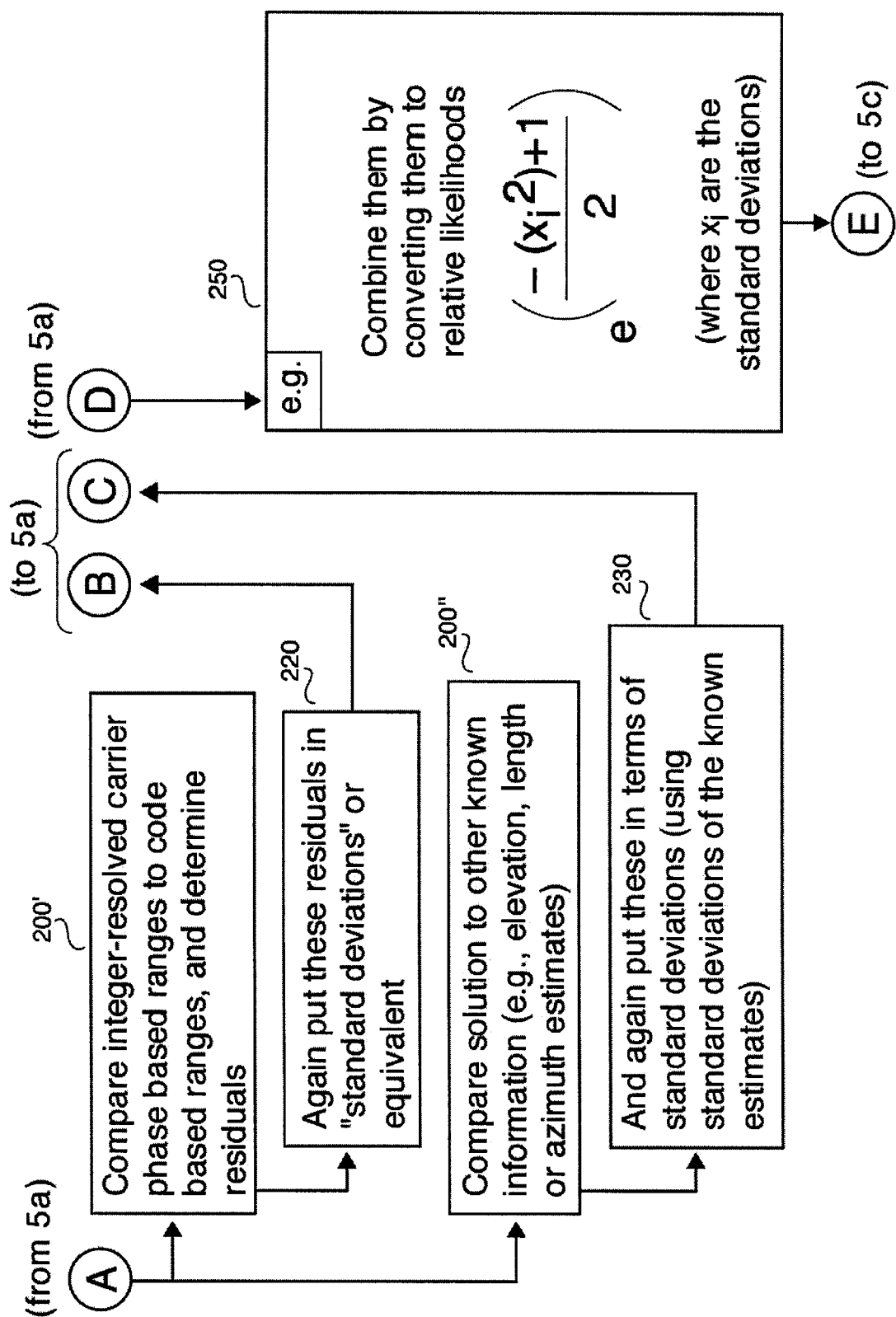
Figure 5C:

FIG. 5 illustrates an exemplary application of multi-valued variable thresholds to carrier phase ambiguity resolution for baseline vectors. In general, FIG. 5 illustrates embodiments of various processes for (1) obtaining test statistics that evaluate potential solutions, (2) placing the test statistics in terms of standard deviations (one useful implementation of multi-valued variable thresholds), and (3) combining several test statistics into an overall figure of merit for each potential solution.

Test Statistics:

A variety of test statistics can be obtained for each potential solution to determine the likelihood of that potential solution being the correct solution. Each test statistic is a type of test that can be performed on a potential solution for which a figure of merit is determined. FIG. 5A shows three different examples of such test statistics. Figures of merit for any one, two, or all of such types can be obtained to evaluate the correctness of each potential solution. Other types of test statistics can also be used to practice the principles of the invention.

One example of a test statistic is, in general, a comparison of the physical baseline solution (step 200) to the individual carrier phase ranges based on the integer ambiguities. From the comparison, residuals are determined. Such residuals are compared (step 210) to an estimated standard deviation to determine how far off (in numbers of standard deviations) each residual is from the estimated standard deviation. In one embodiment, the estimated standard deviation is reduced (step 214) below the estimated carrier phase error to account for a typical three or four degrees of freedom of the physical baseline solution.

Another example of a test statistic is, in cases where the carrier wavelength and the code uncertainty are comparable in value (i.e., by using the wide-laning technique), a comparison of the carrier phase double-difference and an assumed integer ambiguity to the code double-difference. In addition to its use as a search starting point, the code double-difference also provides some value in preferring one potential solution over another. Specifically, the integer-resolved carrier phase based ranges are compared (step 200') to the code double difference, and the residuals are determined. The residuals are placed (step 220) in standard deviations (or equivalent) as described in step 210 above.

Another type of test statistic is to compare (step 200") information computed from the potential solution to other known information, (e.g., elevation differences between antennas, distance between antennas, and/or geographic azimuth of the line connecting the antennas). Such known information can also include a degree of uncertainty. For example, the azimuth angle with respect to North may be known to an uncertainty of plus or minus 45 degrees. Potential solutions that produce an azimuth angle that is outside of this range are valued less than potential solutions that are within the range. Using standard deviations of the known (or estimated) information, each potential solution is placed (step 230) in one of the standard deviations (or equivalent) as described in step 210 above.

Combining Test Results:

The figures of merits associated with all of the test statistics described above can be combined to produce an overall value or figure of merit (e.g., the relative likelihood of being correct) that represents a measure of the credibility of each potential solution. Figures of merit determined from other types of test statistics can also be combined with any combination of the above-described test statistics. In step 240, test statistics are combined by combining the standard deviations produced for each test.

One embodiment of a process for combining the standard deviations is described in connection with steps 250, 252, 254, and 256. Each standard deviation for a test statistic is converted (step 250) to a figure of merit (e.g., relative likelihood) as follows:

$$e^{((-(x_i^2)+1)/2)}$$

where $x_i$ is the number of standard deviations for the i individual tests.

In general, the process initially assigns a figure of merit of 1 to an untested potential solution and with each test (e.g., does the length match? are the residuals small?) the process adjusts the figure of merit of that solution. Depending on how far off a test result is from perfect, measured in standard deviations, the figure of merit is multiplied (step 252) by a normalized Gaussian probability density function. In order to reduce the additional scattering of the expected figures of merit caused by an increasing number of tests, the figure of merit is then normalized by taking a higher-order root of (step 254) the "scatter", where the order of the root is determined by the square root of the number of tests ($\sqrt{n}$). The overall figure of merit of a potential solution is then:

$$\sqrt[\sqrt{n}]{\prod_i^n e^{\left(\frac{-(x_i)^2+1}{2}\right)}}$$

where $x_i$ are the standard deviations of each test and n is the number of tests.

In step 250, one standard deviation of error would give an exponential multiplier of 1 and a perfectly passed test would improve the figure of merit (before de-spreading), by a factor of 1/0.607=1.65. Thus, if the standard deviation estimates are accurate, a correct solution should end up with a figure of merit close to 1. If there is enough information generated by enough tests to distinguish between correct and incorrect potential solutions, incorrect potential solutions should end with a figure of merit much lower than 1.0.

One embodiment uses the natural logarithm of the previous formula for the figure of merit and drops the factor of 2, to reduce the complexity of the calculations. To accumulate the statistics needed for the figure of merit, the process accumulates the square of the standard deviations of error in each test (call these $x_i^2$), and counts the number of tests (call this n). The overall figure of merit used has the form:

$$\frac{n - \sum_i x_i^2}{\sqrt{n}}$$

If standard deviations are accurately estimated, the correct solution should end up with a figure of merit close to 0, and the figures of merit of incorrect solutions will tend lower, especially as the number of tests increases. The threshold should be around −2 to −5, ensuring 85–99% availability of the correct answer, assuming standard deviations are correctly estimated.

Selecting the Correct Solution

After overall figures of merit are determined for each of the potential solutions, various criteria can be used to select the correct solution from among the potential solutions based on such overall figures of merit. In one embodiment, a particular potential solution is determined to be the correct solution if the overall figure of merit of that particular potential solution is the only one of the potential solutions above a predetermined threshold value (e.g., −2). In another embodiment, the potential solutions with the highest overall figure of merit and the next highest overall figure of merit are compared. The potential solution with the highest overall figure of merit is selected as the correct solution if that highest overall figure of merit is greater than the next highest overall figure of merit by a predetermined margin (e.g., two or three times greater than the next highest overall figure of merit).

Applications of Multiple Baselines

FIGS. 6A–6D show the use of multiple vector baselines between pairs of GPS antennas within an antenna array to perform cycle integer ambiguity resolution. The use of multiple measurements greatly reduces the ambiguity resolution search time. Solutions derived from measurements from some baselines are used to discard incorrect solutions from other baselines.

Figure 6A:
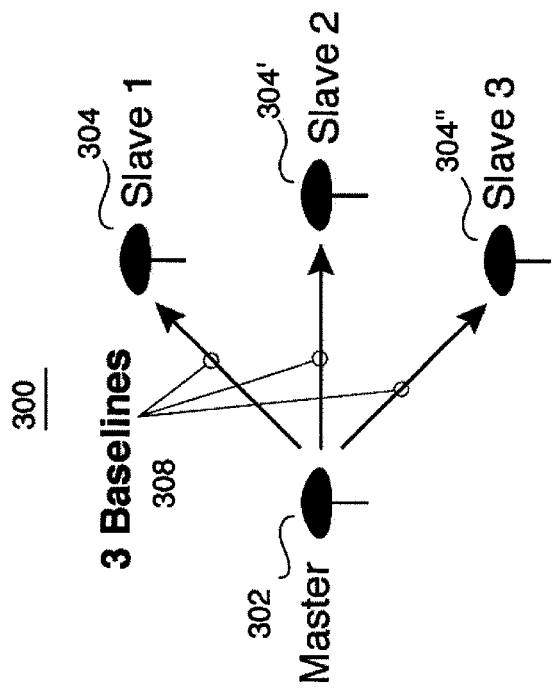
FIG. 6A is a diagram of an array of four antennas arranged in a conventional arrangement in which one antenna is a master antenna and the other three antennas are slave antennas.

FIG. 6A shows typical prior art implementation of an array 300 of three or more antennas. One antenna 302 is designated the master antenna and the remaining antennas 304, 304', 304" (generally 304) are designated slave antennas. There is a single vector baseline 308 between each slave antenna 304 and the master antenna 302. In this implementation, baseline vectors between slave antennas 304 are not used to determine the attitude of the antenna array 300.

Figure 6B:
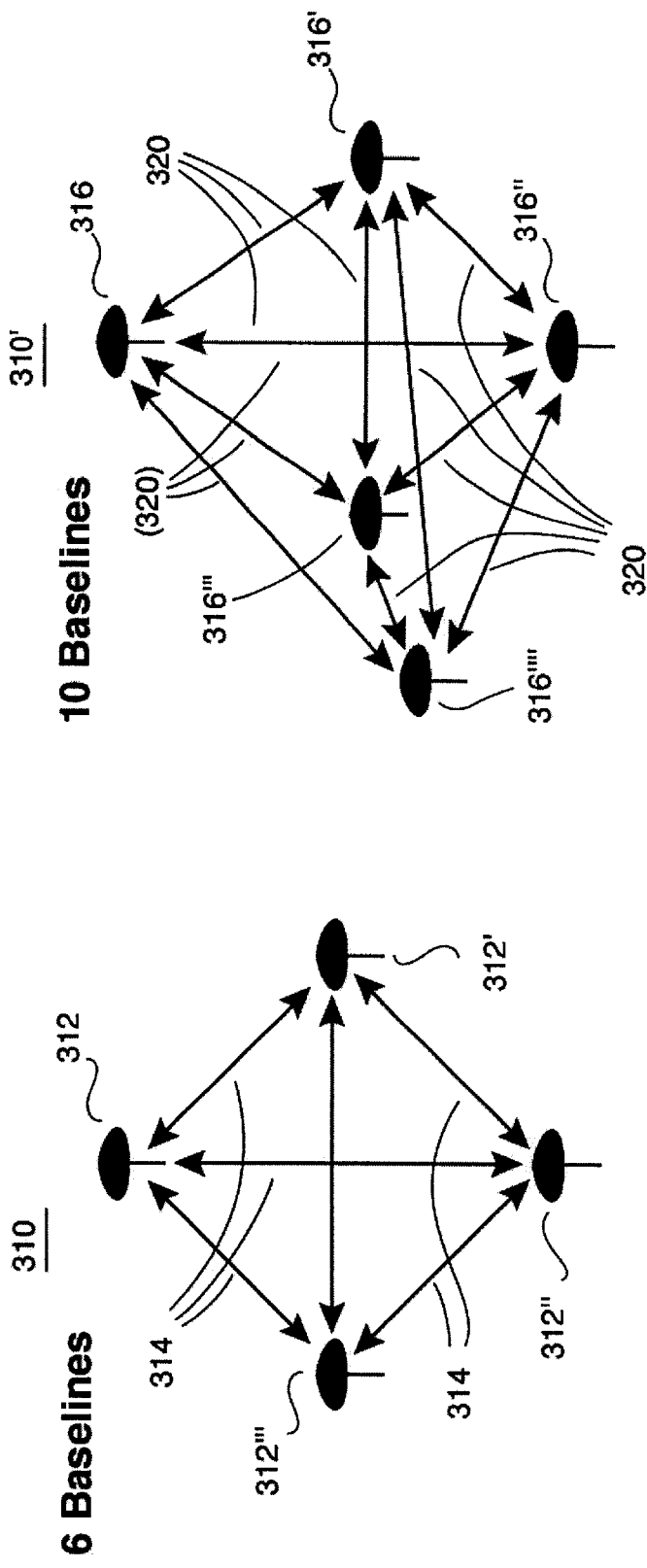
FIG. 6B is a diagram of a four-antenna array and a five-antenna array wherein all antennas within an array are considered peers in accordance with the principles of the invention.

FIG. 6B shows two arrays 310, 310' of antennas embodying the principles of the invention. Antenna array 310 includes four antennas 312, 312', 312", 312'" (generally 312) and six baselines 314. All antennas 312 are treated as peers (i.e., no master-slave arrangement between antennas), and all baseline vectors 314 between pairs of antennas 312 may be evaluated to determine the attitude of the antenna array 310. As another example, antenna array 310' includes five antennas 316, 316', 316", 316'", and 316"" (generally 316), and ten baselines 320. Again, all five antennas 314 are treated as peers and all ten baseline vectors 316 between pairs of antennas 314 may be evaluated to determine the attitude of the antenna array 310'. In general, for an antenna array having n antennas, there are n(n−1)12 baselines that can be used to determine the attitude of the array.

The ability to use of any one of the baselines improves robustness of the cycle integer ambiguity resolution, particularly when the measurement from one antenna may be unavailable or degraded due to antenna, receiver, or cable failure or other form of signal blockage or corruption. In contrast, any such unavailability of the master antenna 320 of FIG. 6A renders the ambiguity resolution of the typical prior art implementation inoperable. Also, the use of multiple baselines in accordance with the principles of the invention improves overall measurement accuracy. The orientations of multiple baselines with correct solutions are averaged (taking into account the angle offsets) to estimate the overall antenna array attitude.

Figure 6C:
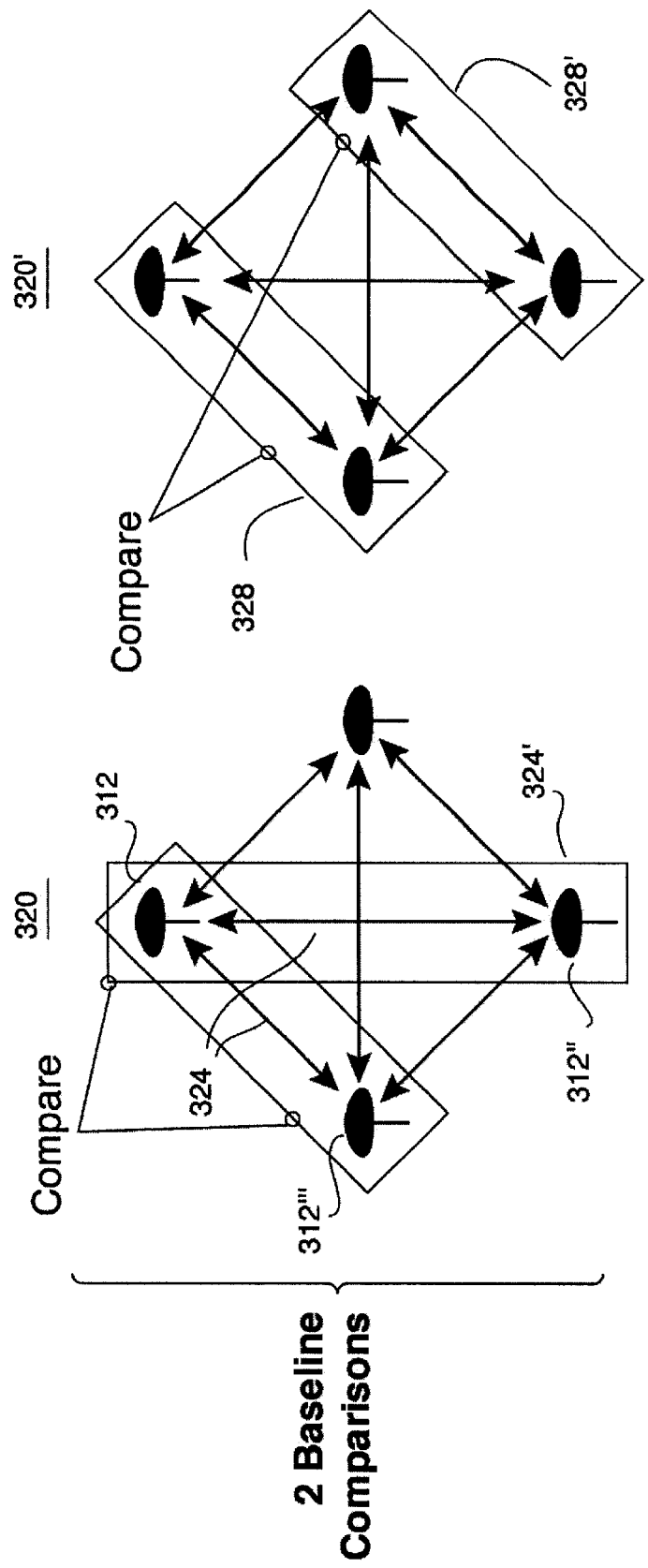
FIG. 6C is a diagram of exemplary arrays of four antennas in which two baselines are compared in the determination of the attitude of the antenna arrays.
Figure 6D:
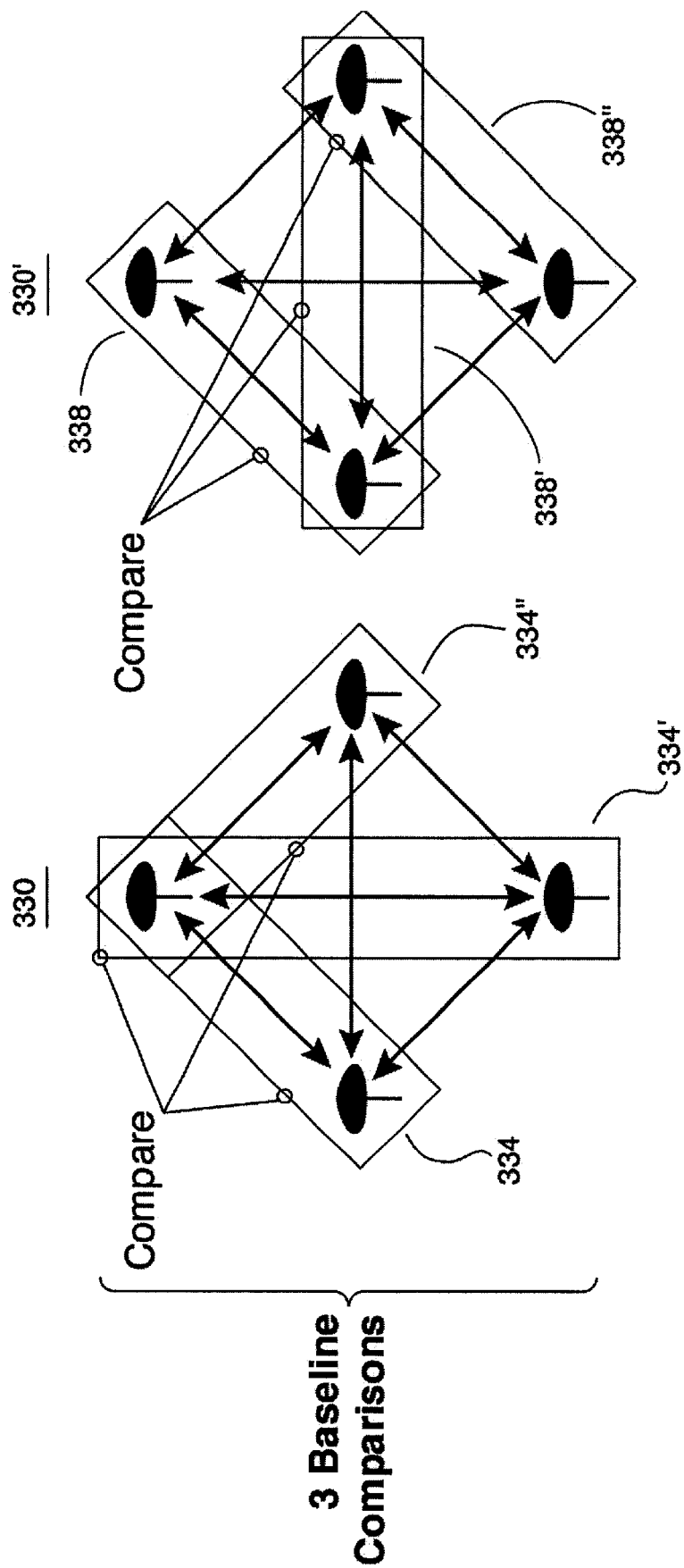
FIG. 6D is a diagram of exemplary arrays of four antennas in which three baselines are compared to determine the attitude of the array.

FIG. 6C shows two embodiments of four-antenna arrays 320 and 320'. Each antenna array 320, 320' illustrate an example of a 2-baseline comparison used to determine the attitude of the corresponding array as described in greater detail below. For example, baselines 324 and 324' are the two compared baselines for array 320, and baselines 328 and 328' are the two compared baselines of array 320'. FIG. 6D shows two embodiments of four-antenna arrays 330 and 330'. Each antenna array 330, 330' illustrate an example of a 3-baseline comparison used to determine the attitude of the corresponding array. For example, baselines 334, 334', and 334" are the three compared baselines for array 330, and baselines 338, 338', and 338" are the three compared baselines of array 330'. As the FIGS. 6C and 6D illustrate, any baseline defined by two antennas of an array can be used in the attitude determination.

FIG. 7 shows an embodiment of a process 400 for determining the attitude of an antenna array using any of the multiple baselines defined by two antennas. The process 400 applies to a configuration of three or more antennas in an array that are to be located with respect to each other. These antennas can be fixed to a body, such as the vehicle 20, or they can be at unknown relative positions. When the antennas are fixed to a body in a rigid manner, there is a substantial amount of information in the relative locations of the antennas and their corresponding baselines, including the baseline lengths and relative orientations.

Within the antenna array, all of the antennas are selected (step 404) in pairs to define m=n(n−1)/2 baselines. For each baseline, a set of potential solutions is determined (step 408). Determination of such potential solutions can be achieved by following the Physical Method 110 or the Ambiguity Method 120 described above in FIG. 2. In one embodiment, figures of merit are computed for each of the potential solutions, also described above in connection with FIGS. 2 and 5. The potential solutions for the baselines can be determined at any time during the process 400, (e.g., all baselines at either the beginning, or when that baseline is needed).

For an antenna array in which the relative positions of the antennas are known, 2 or more baselines (2≦p≦m) are selected (step 412). Hereafter, p represents the number of selected baselines that are evaluated together as a set to determine if the baselines in the set are a correct solution for the attitude of the array. Using the orientations of each of the potential solutions of each of the p baselines, in combination, the best fit 2D or 3D array orientation to match all p baseline orientations is found (step 416).

The residuals between the best-fit array orientation implied baseline orientations and the potential solution baseline orientations are then found (step 420). For these p residuals, a standard deviation is estimated (step 424), for example, and a figure of merit is assigned for each of these fits.

In one embodiment, these figures of merit are combined (step 428) with the figures of merit, if computed, assigned to each potential solution. For example, following the implementation described in FIG. 7, there are now several tests from each potential solution, plus the inter-baseline comparisons, which can all be combined using the multi-valued variable threshold processes described above, such as the formula:

$$\frac{n - \sum_i x_i^2}{\sqrt{n}}$$

where n is the number of tests (on all p baselines plus the inter-baseline comparisons) and $x_i$ are the numbers of standard deviations of error on each test for the i tests. These comparisons augment methods such as those in FIG. 5.

When determining an attitude of an array of antennas of unknown relative position, three or more baselines ($3 \leq p \leq m$) are selected (step 430) including at least one loop with closure. For example, with reference to the antenna array 310 of FIG. 6B, one loop of baselines is from antenna 312 to antenna 312', from antenna 312' to antenna 312", and from antenna 312" to antenna 312. The loop closure is compared (step 444) with an estimated standard deviation to get the "inter-baseline comparison" as described above.

After overall figures of merit are assigned to each attitude orientation, various criteria similar to those described above in FIG. 5 can be used (step 432) to decide which array orientation is best, or if one of the array orientations is most likely to be correct. If a correct array orientation cannot be found, the process 400 repeats (step 436) with another selected set of p baselines, if any remain to be evaluated. This p-baseline comparison process can be carried out for all combinations of p baselines, or just enough combinations that one such comparison provides a unique solution of sufficient confidence for the process 400 to pronounce it the "correct" solution, with an associated figure of merit.

Up to this point in the description, it has been assumed that all processes occur within a single GPS epoch. These processes can be combined from epoch to epoch, potentially keeping track of carrier cycles between epochs, to provide additional test statistics to compare. The carry forward to the next epoch can be done on a per-antenna, per-baseline, or per-array basis or some combination thereof. This provides for an even more robust solution and helps provide solutions when the correct solution is not obvious after a single epoch, especially as short-term noise-like errors will tend to more quickly disqualify wrong answers than correct answers. This method of combining information from multiple epochs can be done in real-time or post-processing, and with a static or dynamic antenna array.

While the invention has been shown and described with reference to specific preferred embodiments, it should be understood by those skilled in the art that various changes in form and detail may be made therein without departing from the spirit and scope of the invention as defined by the following claims.

What is claimed is:

1. In a positioning system having a pair of satellite navigation system receivers, each receiver having an antenna, the antennas simultaneously receiving signals emitted from a plurality of signal transmitters, a method for determining a baseline vector between the antennas of the receivers, the method comprising:

(a) determining a plurality of potential solutions for the baseline vector;

(b) obtaining test results for at least two tests performed on each potential solution; and (c) evaluating each one of the plurality of potential solutions as a candidate for a correct solution for the baseline vector, wherein the evaluating of each potential solution is based on every test result obtained for that potential solution without disqualifying any one of the potential solutions as a candidate for the correct solution based on any one test result.

2. The method of claim 1 comprising defining for a given test a continuum of grades corresponding to degrees of closeness of actual test results for that test to a particular test result.

3. The method of claim 2 wherein each grade is a numerical value.

4. The method of claim 2 wherein each grade is a qualitative measurement.

5. The method of claim 2 wherein the particular test result is a match with known parameters of the positioning system.

6. The method of claim 1 comprising assigning a grade to each test result for a given potential solution, each grade corresponding to a degree of closeness of that test result to a particular test result.

7. The method of claim 6 wherein the particular test result is a match with known parameters of the positioning system.

8. The method of claim 6 comprising combining the grades assigned to the test results for a given potential solution such that every assigned grade for the given potential solution contributes to an overall grade for that potential solution that is used when searching for the correction solution from the plurality of potential solutions.

9. The method of claim 8 further comprising determining that a particular potential solution is the correct solution if the overall grade of that particular potential solution is the only one of the potential solutions above a predetermined threshold.

10. The method of claim 8 further comprising:

determining a highest overall grade and a next highest overall grade among the potential solutions; and selecting the potential solution with the highest overall grade as the correct solution if that highest overall grade is greater than the next highest overall grade by a predetermined margin.

11. The method of claim 1 comprising performing one of the tests by:

computing at least one carrier phase double difference and a code double difference from the received signals;

comparing the computed code double difference with each computed carrier phase double difference; and assigning a grade to the test corresponding to a closeness of the code double difference to each carrier phase double difference.

12. The method of claim 11 further comprising the steps of:

estimating an expected standard deviation for the closeness between the code double difference and each carrier phase double difference; and comparing the expected standard deviation with an actual deviation for each potential solution to determine the assigned grade.

13. The method of claim 1 comprising performing one of the tests by comparing each potential solution with known information relating to the receivers.

14. The method of claim 13 wherein the known information is a length of the baseline vector between the antennas of the two receivers.

15. The method of claim 13 wherein the known information is an elevation angle of the baseline between antennas of the two receivers.

16. The method of claim 13 wherein the known information is an azimuth angle of the baseline between antennas of the two receivers.

17. The method of claim 13 wherein the known information includes a degree of uncertainty.

18. The method of claim 13 wherein the known information is a range of potential orientations of the baseline between antennas of the two receivers.

19. The method of claim 1 further comprising performing ambiguity resolution to determine the plurality of potential solutions for the baseline vector.

20. The method of claim 19 further comprising computing a code double difference measurement, and wherein performing ambiguity resolution operates within a search range determined from the code double difference measurement.

21. The method of claim 19 wherein performing the ambiguity resolution operates within a search range determined from a known length of the baseline vector between the receivers.

22. The method of claim 19 wherein performing ambiguity resolution produces a plurality of possible integers representing a number of whole carrier wavelengths, and further comprising:

computing a carrier phase double difference measurement for each receiver for each possible integer within the search range; and computing an implied baseline vector based on the carrier phase double difference measurements; and comparing the carrier phase double difference from which the implied baseline vector is computed with the actual carrier phase double difference measurement.

23. The method of claim 19 wherein performing ambiguity resolution comprises:

estimating a plurality of possible baseline vectors and calculating a fractional carrier wavelength for each potential solution;

determining a degree of matching between the calculated fractional carrier wavelength for the baseline vector and the measured fractional carrier wavelength for each potential solution; and assigning a grade to each potential solution based on the degree of matching for that potential solution.

24. The method of claim 23 further comprising the steps of:

selecting the potential solutions with a highest degree of matching; and determining a plurality of integers representing a number of whole carrier wavelengths for each potential solution having a degree of matching that exceeds a predetermined threshold.

25. The method of claim 1 wherein steps (a) through (c) occur during each epoch.

26. A positioning system for determining a baseline vector between antennas of a pair of satellite navigation system receivers, the antennas simultaneously receiving signals emitted from a plurality of signal transmitters, comprising:

a processor determining a plurality of potential solutions for the baseline vector from the received signals;

a tester, in communication with the processor, obtaining test results for at least two tests performed on each potential solution; and an evaluator evaluating each one of the plurality of potential solutions as a candidate for a correct solution for the baseline vector, wherein the evaluator bases the evaluation of each potential solution on every test result obtained for that potential solution without disqualifying any one of the potential solutions as a candidate for the correct solution based on any one test result.

* * * * *